June 7, 1960 A. FRÖHLICH ET AL 2,939,520
TIRE BUFFING MACHINE

Filed June 25, 1956 2 Sheets-Sheet 1

INVENTORS
ADOLF FRÖHLICH &
EDWARD J. HARRIS
BY
ATTORNEY

June 7, 1960   A. FRÖHLICH ET AL   2,939,520
TIRE BUFFING MACHINE

Filed June 25, 1956   2 Sheets-Sheet 2

INVENTORS
ADOLF FRÖHLICH &
EDWARD J. HARRIS
BY
ATTORNEY

United States Patent Office 2,939,520
Patented June 7, 1960

2,939,520

TIRE BUFFING MACHINE

Adolf Fröhlich and Edward J. Harris, Akron, Ohio, assignors to The Cleveland Trust Company, Cleveland, Ohio, as trustee Filed June 25, 1956, Ser. No. 593,464

10 Claims. (Cl. 157—13)

This invention relates to the art of retreading pneumatic tires and in particular has reference to improvement in buffing equipment that is used to prepare the exterior surface of a used tire carcass for a recapping operation.

In the known prior art of buffing pneumatic tires prior to recapping, it has long been known that the exterior crown surface of the used carcass must be buffed to remove excess tread stock that is present on the same carcass. In present day devices, this buffing operation is normally confined to the exterior crown region of the tire due to the fact that recapped tires at the present time are normally provided with new tread stock only in the crown region.

However, with the development of certain newly introduced retreading procedures wherein the exterior surface of a worn carcass is covered from bead to bead, it has been found necessary that the sidewall portions of the tire be buffed as well as the crown region in which the tread is normally applied.

At the present time, it has not been possible to utilize known prior art devices for this purpose, in view of the fact that the same are incapable of being shifted through a horizontal path of movement so that the sidewalls, as well as the tread portion of the tire, can be buffed.

As an additional disadvantage in the known prior art, it has been found that the revolving brush normally employed by the prior art is incapable of adjustment radially of the tire with the result that machines in this present day prior art of this type are normally limited to use for one size of tire only. As a result of this confined adjustment, it is difficult and expensive to adjust the machine for use on additional sizes of tires.

It accordingly becomes the principal object of this invention to provide a buffing machine for use in the retreading of pneumatic tires that is characterized by the fact that the same can buff the tire from bead to bead.

It is a further object of this invention to provide a buffing equipment for use in retreading pneumatic tires that is characterized by ease of adjustment whereby the component parts thereof can be easily shifted into varying positions for use with different size pneumatic tires.

It is a further object of this invention to provide a buffing machine for retreading tires that is compact in size, efficient in use and is semi-automatic in operation.

These and other objects of the invention will become more apparent upon the reading of the following brief specifications, considered and interpreted in the light of the accompanying drawings.

Figure 1:
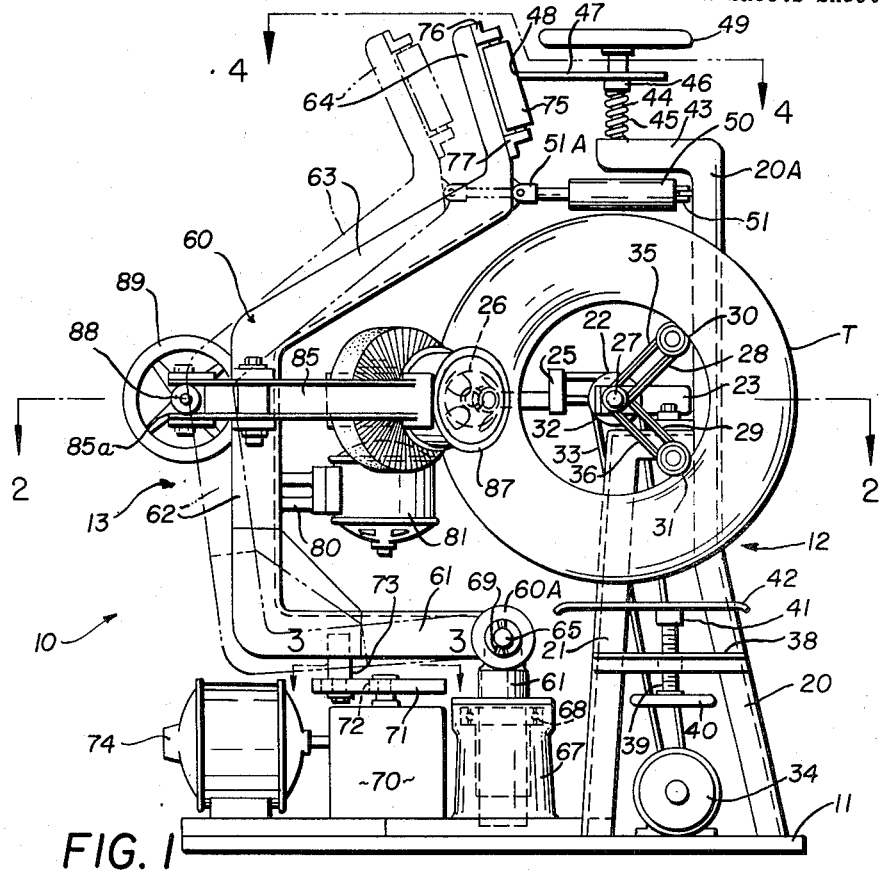
Figure 1 is a side elevation showing the improved buffing equipment and illustrating the position of certain component parts in chain-dotted line position.
Figure 3:
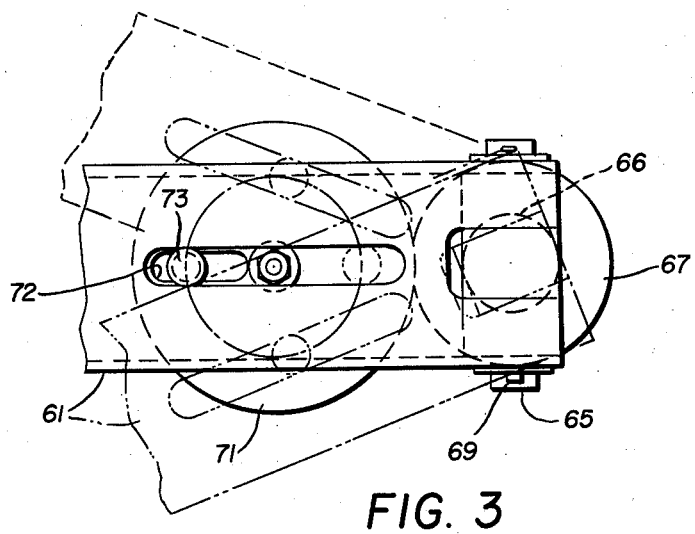
Figure 4:
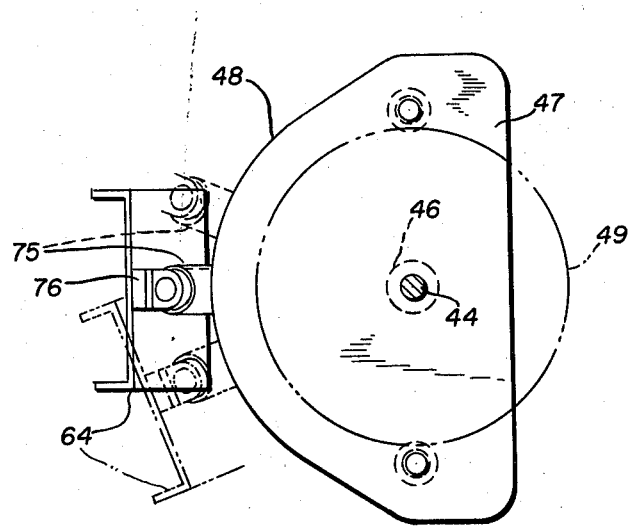

Figures 3 and 4 are sectional views taken on lines 3—3 and 4—4 respectively of Figure 1.

Figure 2:
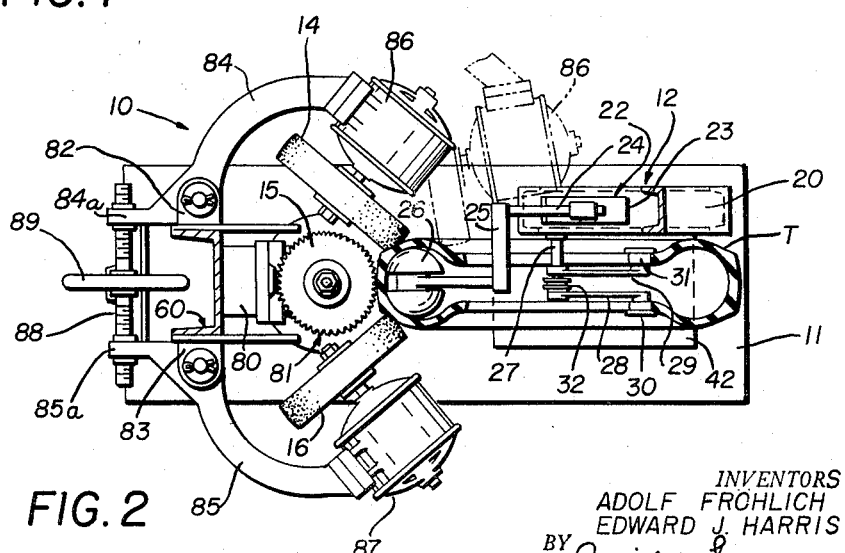
Figure 2 is a horizontal section taken on the lines 2—2 of Figure 1.

Referring now to the drawings, and in particular, to Figures 1 and 2 thereof, the improved buffing machine, generally designated by the numeral 10, is shown including a base 11, upon which is received a tire supporting mechanism 12 and a buffing unit 13, with the unit 13 being swingable, under controlled conditions with respect to a tire T so as to be selectively moved into and out of buffing contact therewith as will be described. In this manner, the revolving brushes 14, 15, and 16 can be swung into contact with the revolving tire T and at this time the buffing unit 13 can be arcuately shifted in a horizontal plane so that the tire T can be buffed from bead to bead, as will presently be described.

In order that the invention might be better understood, tire supporting mechanism 12 and the buffing unit 13 will be separately described as will the operation of the entire device.

*The tire supporting mechanism*

Considering first the structure of the tire supporting means 12, it will be seen from the drawings that the same includes an upright standard 20, as well as an auxiliary support standard 21 upon which is received adjustable tire support means that are indicated generally by the numeral 22 in Figure 1 of the drawings. This means 22, as best shown in Figure 2 includes a cylindrical chamber 23, within which may be reciprocally received a piston rod 24, that has its free or outboard end secured to a connecting plate 25, that in turn connects with a rotatable bell-type support 26, that may be positioned with respect to the tire so as to be in supporting engagement therewith as shown in Figure 2 of the drawings, the arrangement being such that the bell-type support 26 will engage the interior wall of the tire T upon axial extension of the piston rod 24 to the position shown in Figure 2.

The cylindrical housing 23 also supports a shaft 27 about which are keyed arms 28 and 29 that respectively support on their outboard ends rollers 30 and 31. Also rotatively keyed to the shaft 27 is a sheave 32 about which may be played a pulley belt 33 that is also received about the drive shaft of the motor 34 in known manner. Auxiliary pulleys 35 and 36 are shown in Figure 1 of the drawings as respectively driving the roller members 30 and 31 so that the same will rotate upon rotation of the motor 34. In this regard, these arms 28 and 29 are generally positioned at approximately right angles to each other so that the rollers may rotatively contact the inner bead surfaces of the tire T as best shown in Figure 2 of the drawings, to thus provide a three-point rotational support for the tire T.

For the purpose of supporting the tire T prior to the mounting upon the adjustable tire supporting means just described, the standards 20 and 21 are shown interconnected by horizontal platform 38 that has a threaded aperture provided therein so that a screw shaft 39, having handle 40, may be received therethrough. The projecting end of the shaft 39 is shown received in fitting 41 that is, in turn, attached in known manner to support platform 42 and in this manner the vertical height of the platform 42, with respect to the base 11, may be adjusted by merely rotating the handle 40.

As is best shown in Figure 1 of the drawings the uppermost end 20A of the upright standard 20 further includes a horizontal extension 43 that receives therein a shaft 44 that is surrounded by spring 45 and mounting bushing 46. The bushing 46 is attached in known manner to a flat cam plate 47 (see Figure 4) that has an arcuate front edge portion 48 that contacts certain component parts of the buffing unit 13 as will be presently described. In this regard it suffices to note that handle 49 facilitates the raising or lowering of the plate 47 with respect to the base 11 so that the same may have its relative height above base 11 varied as required.

Also carried by the upper end 20A of the support standard 20 is a cylinder and piston unit 50 that is pivotally mounted, as at 51, to uppermost portion 20A with the piston rod end 51A thereof being pivotally connected to certain component parts of the buffing unit 13 as will presently be described.

The buffing unit 13

Turning now to the consideration of the detailed structure of the buffing unit 13, it will be seen from the drawings that the same has as its main component, a frame member 60 of generally U-shaped configuration and including a horizontal leg 61, a vertical leg 62, an angularly disposed leg 63 and an upper leg portion 64; the arrangement being such that the horizontal leg 60 is pivotally journalled around a shaft 65 that is, in turn, rotatable with respect to an upright cylinder 66 that has its axis mounted coincident with a support casting 67 that secured to the frame 11 in known manner, with ball races 68 being provided for facilitating rotation of the member 66 about a vertical axis while cotter pin 69 secures the bushings 60A of leg portion 61 with respect to the shaft 65.

As a result of the mounting of the frame 60 as just described, it is believed apparent that the same is arcuately movable in two distinct paths of movement. First the frame 60 may pivot, as shown, in full and chain-dotted lines in Figure 1 about the axis of shaft 65. Secondly, the frame 60 also moves about the axis of member 66 with the result that upper leg portion 64 moves as shown best in Figure 4.

To the end of controlling such movement, the base 11 further includes a speed reduction unit 70, which includes a rotatable plate 71 that has therein a slot 72 (see Figure 3) within which may be received a pin 73 that projects downwardly from the horizontal leg 61. In this manner rotation of the plate 71 will cause the entire bracket unit 60 to reciprocate through a horizontal plane of movement as defined by the axis of rotation of the member 66 within the support casting 67, with motor 74 providing the requisite power for turning the frame member 60 about its pivot point as defined by the cylinder 66.

To the end of controlling movement of the uppermost portion 64 of frame 60 between the full and chain-dotted line positions of Figure 1, the uppermost portion 64 is shown as further including a roller member 75, that is supported at its axial ends between appropriate bearings 76 and 77; the arrangement being such that attachment of the end 51A of cylinder and piston unit 50 to the lower portion of member 64 will result in the roller 75 being positioned against the contoured edge 48 of cam plate 47.

As is best shown in Figure 2 of the drawings, the upright portion 62 of the frame member 60 further includes a bracket support 80, upon which is mounted a motor 81, that has a brush 15 mounted on its drive shaft in known manner, with this brush 15 revolving in a horizontal path of movement.

For the purposes of mounting the brushes 14 and 16 for unitary movement with the frame member 60, the upright portion 62 of frame 60 further includes mounting lugs 82, 83 which pivotally support arcuate shaped arm members 84 and 85 respectively. These arm members 84 and 85 support, at their outermost ends, motors 86 and 87 that respectively drive the brushes 14 and 16 as is best shown in Figure 2 of the drawings.

To the end of arcuately adjusting the arms 84 and 85 about the pivotal points of connection with the brackets 82 and 83 the same (arms 84 and 85) are shown as having their ends 84A and 85A receiving a double threaded shaft that is indicated generally by the numeral 88 and which includes a turning wheel 89, the arrangement being such that rotation of the wheel 89 in one direction will cause the ends 84A and 85A to move apart while rotation in the opposite direction will cause the same to move towards each other.

Operation of the buffing device

In use or operation of the improved buffing machine 10, it will first be assumed that the tire T has not yet been placed upon the adjustable tire support means 22 and further in this regard, that the frame member 60 has been shifted to the chain-dotted line position of Figure 1 as the result of the extension of the end 51A of cylinder and piston unit 50. In this position, the roller 75 will be out of contact with a cam plate 47. At this time the tire T may be placed upon the supporting platform 42 that has previously been adjusted to the preferred height to facilitate easy handling of the tire T during this stage of the operation.

At this point the tire T may be positioned with respect to the adjustable tire support means 22 so that the bell-shaped roller 26 is received loosely between the beads of the tire T while the rollers 30 and 31 are positioned against the inner bead faces as best shown in Figures 1 and 2 of the drawings. When this preliminary positioning has been effected, the piston 24 may be energized so that the plate 25, together with the bell-shaped roller 26 moves to the position shown in Figures 1 and 2. At this time the tire will be supported at three points with respect to the adjustable tire supporting means 22, with contact on the inner surface of tire T being made by the bell roller 26 while the bead faces ride against the rollers 30 and 31 as clearly shown in Figure 1 of the drawings.

With the tire thus positioned, rotation of the same may be initiated by merely energizing the motor 34 so that the belt 33 will rotate to cause similar rotational movement of belts 35 and 36, with the result that the rollers 30 and 31 will be driven. As a result of the contact between these rollers and the inner bead faces of tire T the same tire T will rotate about its axis as defined by the shaft 27. During this movement, the roller 26 will be rotatably idling against the inner crown wall of the tire T and will tensionally urge the same outwardly at all times due to the force exerted by the piston 24.

At such time as the tire T is rotating in the manner just described, the buffing unit 13 may be brought into usage by first energizing motors 81, 86 and 87 to cause rotation of brushes 15, 14 and 16 respectively. When these brushes are rotating as just described, the cylinder and piston unit 50 may be operated so the end 51A thereof will be moved to the right of Figure 1 so as to pivot the frame 60 about shaft 65 from the chain-dotted to the full line position of Figure 1 with the extent of such movement of the frame 60 being determined as the result of the contact between the roller 75 and the arcuate edge 48 of the cam plate 47. When such contact has been made the parts will be positioned substantially as shown in Figure 2 of the drawings and the brush 15 will be in contact with the central portion of the tread while the brushes 14 and 16 will be respectively contacting the upper edges of the sidewalls in the area adjacent to the crown region of the tire.

At this time the motor 74 may be energized to cause rotation of the plate 71 and as a result of movement of pin 73 in slot 72 of the plate 71, the entire frame 60, together with auxiliary arms 84 and 85 will be swung arcuately in a horizontal plane as the result of the member 66 rotating about its axis within the casting 67. In this regard, it will first be assumed that this first-described arcuate movement is upwardly of Figure 2 so that the entire frame 60, including the motor 86 and wheel 14 will move to the position indicated in chain-dotted lines of Figure 2 of the drawings. During this movement, it is believed apparent that the entire sidewall surface of the tire T will be contacted by the arcuately moving brush 14 and similarly the brush 16 will contact the crown portion of the tire to a point midway thereof.

Upon continued rotation of the plate 71, the same will move from the position shown in dotted lines of Figure 3 to the position shown in chain-dotted lines of Figure 3 with the result that the brush 14 will now move up the sidewall portion once again while the brush 16 is moving across the opposite sidewall portion into an area adjacent to bead portion. As a result of this oscillation of the frame 60 about the axis of the member 66, it is believed apparent that all exterior exposed surfaces of the tire T will be brushed and prepared from bead to bead and that a complete renovation of the exterior surface of the tire T will have been effected. During this movement it is believed important to note that the roller 75 will roll across arcuate edge 48 of plate 47 as shown in the dotted line positions thereof of Figure 4 of the drawings, with the result that the brushes 14 and 16, as well as the buffing wheel 15, will be unable to move any closer to the tire than the position shown in Figure 2 of the drawings.

In the event it is desired to remove excess stock from the tire T, it is merely necessary that the plate 47 be raised vertically (Figure 1) by turning the handle 49 to permit the spring 45 to raise the plate 47. This raising of the plate 47 will permit the roller 75 to move even further to the right than is shown in full line position of Figure 1 with the result that frame 60, together with the revolving brushes carried thereby, will be moved closer to tire T. By like token, if it is desired to remove less scrap from the tread, it is merely necessary that plate 47 be lowered against the force of spring 45 so that the degree of pivotal movement of the frame 60 about shaft 65 is accordingly restricted.

When the buffing operation just described has been concluded and the required amount of scrap has been removed, it is merely necessary that the cylinder and piston unit 50 be energized so as to extend the end 51A thereof to the chain-dotted line position of Figure 1, which movement will cause a similar movement of the frame 60 to the chain-dotted line position of Figure 1. At this time the brushes 14, 15, and 16 will have been moved out of contact with the revolving tire T and at this time the motor 74 may be stopped so that oscillation of the plate 71 will similarly terminate. When oscillation of the frame 60 has been stopped, the rotation of the tire T may be stopped also by de-energizing the motor 34 and at this time the piston 24 may be actuated to move the same to the right, with the result that the three points of support offered by the roller 26 and the rollers 30 and 31 will be removed, at which time the tire T may easily be removed from collapsed tire supporting means 22.

With the adjustable tire support collapsed, and all moving parts stopped, the tire T may then easily be removed to table 42 from which it may be transferred to a conveyor or other moving device for delivery to another station.

It will be seen from the foregoing that there has been provided a new and novel type of buffing machine that is characterized by compound movement of rotating brushes with respect to a tire revolving about a fixed axis. It has been shown how the horizontal oscillatory movement of the rotating brushes operates to remove tread stock and prepare the exterior surface of the tire from bead to bead and how the amount of stock to be removed is actually controlled as the result of the limited vertical movement of the frame member 60 about its point of pivotal movement of the frame member around shaft 65.

It will be seen from the specification that adjustment relating to the location of the brushes with respect to the centerline of the tire is easily facilitated as a result of the cam plate 47 being capable of being adjusted vertically.

While a detailed description of this invention has been made in accordance with the patent statutes, it is to be understood that the invention is not to be so limited and, accordingly, it is to be understood that the invention contemplates the broadest possible form of equivalent structure in this regard.

In this regard, it is within the scope of this invention to provide other driving means for the tire as shown herein in the preferred embodiment. Thus, for example, the bell 26 could be driven while rolls 30 and 31 merely served as idler rolls.

It accordingly follows that other modifications of the invention may be resorted to without departing from the spirit thereof or the scope of the appended claims.

What is claimed is:

1. A tire-buffing machine of the character described, comprising; a base; a support frame projecting substantially normal to said base; tire supporting means carried by said support frame and defining an axis of rotation substantially parallel to said base; a second elongate frame, hinged at one end thereof to said base and projecting therefrom in the same direction as said support frame; buffing means carried by said second frame adjacent a central portion thereof; means for shifting the free end of said second frame toward the free end of said support frame whereby said buffing means are shiftable with respect to said axis of rotation that is defined by said tire-supporting means and cam means for limiting the extent of shifting of said support frame towards said tire supporting means.

2. The device of claim 1 further characterized by the fact that said tire-supporting means includes drive rollers for rotating a supported tire about the axis of rotation defined thereby.

3. The device of claim 1 further characterized by the fact that said buffing means include a pair of spaced brushes rotating about spaced axes of rotation; and means for varying the spacing between said axes.

4. The device of claim 1 further characterized by the fact that said shifting means includes an expansible piston interconnecting the free ends of said frames.

5. The device of claim 1, further characterized by the fact that said second frame is hinged to a support member that is rotatable in a plane parallel to said base.

6. A tire-buffing machine of the character described, comprising; a base; a support frame projecting substantially normal to said base; tire supporting means carried by said support frame and defining an axis of rotation substantially parallel to said base; a second elongate frame, hinged at one end thereof to said base and projecting therefrom in the same direction as said support frame; buffing means carried by said second frame adjacent a central portion thereof; means for shifting the free end of said second frame toward the free end of said support frame whereby said buffing means are shiftable with respect to said axis of rotation that is defined by said tire-supporting means cam means for limiting the extent of shifting of said support frame towards said tire supporting means; and means for oscillating said buffing means transversely of said base.

7. The device of claim 6 further characterized by the fact that said shifting means includes an expansible piston interconnecting the free ends of said frames; a cam plate defined by said cam means and carried adjacent the end of one said frame in longitudinally shiftable relationship therewith; and a roller carried by the other said frame adjacent its free end and contacting said plate upon movement of said frames toward each other.

8. A tire buffing machine of the character described, comprising; a frame; support means for rotatably supporting a pneumatic tire with respect to said frame; buffing means shiftably carried by said frame in proximity with a tire supported on said support means; means for oscillating said buffing means through an arcuate path transverse to the tread of a tire supported on said support means; shifting means for moving said frame and said buffing means towards and from said support means; and cam means limiting the extent of movement of said frame and buffing means towards said support means by said shifting means; said cam means being shiftable relatively of said support means; the extent of movement of said buffing means towards said support means being varied during shifting of said cam means.

9. A tire buffing machine of the character described, comprising; a main frame; a tire supporting means carried by said main frame for rotatably supporting a tire with respect thereto; a second frame pivotally carried by said first frame; buffing means carried by said second frame; shifting means interconnecting said first and second frames and moving said second frame relatively of said first frame, whereby said buffing means may be moved into and out of contact with a tire carried on said support means; and cam means limiting the extent of movement of said second frame towards said first frame said cam means being shiftable relatively of said first frame; the extent of movement of said second frame towards said first frame being varied during shifting of said cam means.

10. A tire buffing machine of the character described, comprising; a first frame; a tire supporting means carried by said first frame for rotatably supporting a tire with respect thereto; a second frame pivotally connected with said first frame; buffing means carried by said second frame; shifting means interconnecting said first and second frames and moving the same toward and from each other, whereby said buffing means and a tire supported on said support means may be moved into and out of contact with each other; and cam means limiting the extent of movement of said first and second frames towards each other; said cam means being variable with respect to at least one said frame, whereby the extent of movement of said first and second frame members towards each other can be varied.

References Cited in the file of this patent
UNITED STATES PATENTS

| | | |
|---|---|---|
| 1,614,076 | McClenathen | Jan. 11, 1927 |
| 1,827,637 | Andrews | Oct. 13, 1931 |
| 1,848,684 | Woock | Mar. 8, 1932 |
| 2,085,650 | Godfrey, Jr. | June 29, 1937 |
| 2,707,851 | Strong | May 10, 1955 |
| 2,788,851 | Rawls et al. | Apr. 16, 1957 |